United States Patent [19]

Yamamoto et al.

[11] Patent Number: 5,100,964
[45] Date of Patent: Mar. 31, 1992

[54] RUBBER COMPOSITION

[75] Inventors: Keisaku Yamamoto; Yoshio Tanimoto; Kiyoshi Ikeda; Nobuhiro Natsuyama; Sumio Hara; Junichi Koshiba, all of Chiba, Japan

[73] Assignee: Sumitomo Chemical Co., Ltd., Osaka, Japan

[21] Appl. No.: 666,314

[22] Filed: Mar. 8, 1991

[30] Foreign Application Priority Data

Mar. 12, 1990 [JP] Japan ................................. 2-62170
Nov. 27, 1990 [JP] Japan ................................. 2-326674

[51] Int. Cl.$^5$ ............................................. C08L 23/10
[52] U.S. Cl. ........................................ 525/222; 525/57; 525/330.6
[58] Field of Search ....................... 525/57, 222, 330.6

[56] References Cited

U.S. PATENT DOCUMENTS

| | | | |
|---|---|---|---|
| 4,503,102 | 3/1985 | Mollison | 525/222 |
| 4,611,029 | 9/1986 | Takahashi | 525/330.6 |
| 4,614,781 | 9/1986 | Hori et al. | 525/330.6 |

FOREIGN PATENT DOCUMENTS

| | | | |
|---|---|---|---|
| 0152911 | 8/1985 | European Pat. Off. | 525/222 |
| 57-73035 | 5/1982 | Japan. | |
| 57-180647 | 11/1982 | Japan. | |
| 59-15345 | 4/1984 | Japan. | |

*Primary Examiner*—Paul R. Michl
*Assistant Examiner*—Olga Asinovsky
*Attorney, Agent, or Firm*—Sughrue, Mion, Zinn, Macpeak & Seas

[57] ABSTRACT

A rubber composition is disclosed, comprising (a) 100 parts by weight of a synthetic rubber and (b) from 0.5 to 10 parts by weight of an alkylene oxide adduct of a saponified ethylene-saturated carboxylic acid vinyl ester copolymer. The rubbber composition can provide a vulcanized rubber composition which can retain its excellent appearance over a prolonged period of time because of freedom from blooming, has excellent antistatic performance due to its electrical conductivity, can be colored in various tints including white, and also has excellent properties in terms of tensile strength and specific gravity.

6 Claims, No Drawings

RUBBER COMPOSITION

FIELD OF THE INVENTION

The present invention relates to a rubber composition. More particularly, the invention relates to a rubber composition that can provide a vulcanized rubber composition which can retain its excellent appearance over a prolonged period of time because of freedom from blooming, has excellent antistatic performance due to its electrical conductivity, can be colored in various tints including white, and also has excellent properties in terms of tensile strength and specific gravity.

The vulcanized rubber composition can be utilized in a wide range of fields taking advantage of its excellent properties described above. For example, such uses are in applications which are taking advantage of mainly the excellent appearance of the vulcanized rubber composition such as automotive rubber parts (e.g., interior automotive trim parts made of rubber, weather strips, window frames, various hoses, tubes, brake parts, rubber vibration insulators, rubber parts for automotive body, and sidewalls), rubber building parts (e.g., waterproof sheets and gaskets), general-purpose industrial parts made of rubber (e.g., linings, belts, sealing materials, packings, rubber rolls, O-rings, diaphragms, electrical wires, sealants, hose linings, and various boots), and rubber parts for helmets, and also in applications which are taking advantage of mainly the antistatic characteristics and whiteness of the vulcanized rubber composition, such as paper-feed belts or rolls for use in copying machines, printers, facsimile machines, optical character readers, cash dispensers, money exchange machines, computers, automatic vending machines, etc.

BACKGROUND OF THE INVENTION

It is known that vulcanized rubber compositions generally suffer so-called blooming, in which vulcanization accelerators, etc. migrate to the surfaces and deposit thereon with the lapse of time, so that the appearance of the vulcanized rubber compositions deteriorates.

A known method for inhibiting such blooming is to incorporate a non-reactive phenol-formaldehyde resin or polyethylene glyco) (see JP-B-59-15345). (The term "JP-B" as used herein means an "examined Japanese patent publication".)

Although this conventional technique is effective in retarding the progress of blooming to some degree, it has been ineffective in preventing the occurrence of blooming over a sufficiently long period of time.

On the other hand, as a technique for imparting electrical conductivity and antistatic performance to vulcanized rubbers, incorporation of carbon black or a metal powder into rubbers in known.

However, use of carbon black has had a problem that since the resulting rubber inevitably assumes a black color, it cannot be used in applications requiring tints other than black, for example, such applications as a paper-feed belt or roller which is strictly required not to cause black fouling. Further, use of a metal powder has been defective in that the resulting rubber has a reduced tensile strength and an increased specific gravity.

SUMMARY OF THE INVENTION

The present inventors have conducted intensive studies in order to overcome the above-described problems and, as a result, the present invention has been completed.

Accordingly, an object of the present invention is to provide a rubber composition that can confer a vulcanized rubber composition which can retain its excellent appearance over a prolonged period of time because of freedom from blooming, has excellent antistatic performance due to its electrical conductivity, can be colored in various tints including white, and also has excellent properties in terms of tensile strength and specific gravity.

That is, the present invention relates to a rubber composition comprises (a) 100 parts by weight of a synthetic rubber and (b) from 0.5 to 10 parts by weight of an alkylene oxide adduct of a saponified ethylene-saturated carboxylic acid vinyl ester copolymer.

DETAILED DESCRIPTION OF THE INVENTION

The synthetic rubber (a) which is used in the rubber composition of the present invention is not particularly limited, and may be any of a wide variety of synthetic rubbers. Examples thereof include ethylene-α-olefin copolymer rubbers, styrene-butadiene copolymer rubbers (SBR), chloroprene rubbers (CR), acrylonitrile rubbers (NBR), and isoprene-isobutylene copolymer rubbers (IIR).

The ethylene-α-olefin copolymer rubbers herein mean copolymers of ethylene and at least one α-olefin (EPM) or copolymers of ethylene, at least one α-olefin, and at least one nonconjugated diene (EPDM). Examples of the α-olefin include propylene, 1-butene, 1-pentene, and 1-hexene. Examples of the nonconjugated diene include dicyclopentadiene, ethylidene norbornene, 1,4-hexadiene, and methyltetrahydroindene.

The alkylene oxide adduct (b) of a saponified ethylene-saturated carboxylic acid vinyl ester copolymer (hereinafter, often referred to as "adduct (b)") which is used in the rubber composition of the present invention is an adduct obtained by the addition of an alkylene oxide to a saponification product of a copolymer comprising ethylene and a saturated carboxylic acid vinyl ester.

As the saturated carboxylic acid vinyl ester, any of a wide variety of such esters may be used without any particular limitation. Examples thereof include vinyl acetate, vinyl propionate, and vinyl butyrate, with vinyl acetate being preferred.

As the alkylene oxide, any of various alkylene oxides may be used without any particular limitation. Examples thereof include ethylene oxide, propylene oxide, and butylene oxide, with ethylene oxide being preferred.

The ethylene-saturated carboxylic acid vinyl ester copolymer is not particularly limited with respect to the ethylene content and number average molecular weight. Preferably, however, the ethylene content and number average molecular weight of the copolymer are from 1 to 90% by weight and from 1,000 to 20,000, respectively.

The saponification degree of the saponified ethylene-saturated carboxylic acid vinyl ester copolymer is not particularly limited, but is preferably in the range of from 30 to 100%, more preferably from 50 to 100%.

The amount of the alkylene oxide added to the saponified ethylene-saturated carboxylic acid vinyl ester copolymer is not particularly limited, but is preferably in the range of from 20 to 1,000 parts by weight per 100 parts by weight of the saponified copolymer.

The adduct (b) which is used in the rubber composition of the present invention can, for example, be obtained as follows.

First, an ethylene-saturated carboxylic acid vinyl ester copolymer is heated in a solvent in the presence of an alkali, thereby to obtain a saponified ethylene-saturated carboxylic acid vinyl ester copolymer. This saponified copolymer is then reacted with an alkylene oxide by heating in the presence of an alkali. From the resulting reaction mixture, the adduct (b) to be used in the present invention is separated and obtained.

In the rubber composition of the present invention, the above-described adduct (b) is contained in an amount of from 0.5 to 10 parts by weight, preferably from 1 to 5 parts by weight, per 100 parts by weight of the above-described synthetic rubber. (a). If the amount of adduct (b) is below 0.5 part by weight, the effect of inhibiting the occurrence of blooming in the resulting vulcanized rubber composition and the effect of imparting antistatic performance to the vulcanized rubber are insufficient. On the other hand, an adduct (b) amount exceeding 10 parts by weight poses practical problems such as a decrease in the strength of the resulting vulcanized rubber composition, although the effect of inhibiting the occurrence of blooming and the effect of imparting antistatic performance are maintained.

From the rubber composition of the present invention, a vulcanized rubber composition can, for example, be obtained by the following method.

That is, synthetic rubber (a), adduct (b), and optionally, other compounding additives which are ordinarily used in the rubber industry, such as an anti-aging agent, a processing aid, etc., are kneaded by means of an internal kneading machine, open rolls, an extruder, or the like. Into the thus-obtained composition are incorporated a vulcanizing agent, a vulcanization accelerator, etc., thereby to obtain an unvulcanized composition. By vulcanizing this unvulcanized composition in an ordinary way, a vulcanized rubber composition can be obtained.

If desired, various additives known in the rubber-processing industry may be incorporated in the rubber composition of the present invention. Examples of such additives include carbon black, mineral fillers, e.g., talc, clay, calcium carbonate, and silica, and a process oil as a softener.

The vulcanizing agent to be added to the rubber composition of the present invention may be either a sulfur compound or an organic peroxide. Examples of the sulfur compound include sulfur, sulfur chloride, sulfur dichloride, morpholine disulfide, alkylphenol disulfides, tetramethylthiuram disulfide, and selenium dimethyldithiocarbamate. Of these, sulfur is preferably used.

Examples of the organic peroxide include dicumyl peroxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3, di-t-butyl peroxide, di-t-butyl-peroxy-3,3,5-trimethylcyclohexane, and t-butyl hydroperoxide. Of these, dicumyl peroxide, di-t-butyl peroxide, and di-t-butylperoxy-3,3,5-trimethylcyclohexane are preferably used.

In the case where a sulfur compound is employed as the vulcanizing agent, it is preferable to use a vulcanization accelerator in combination. Examples of the vulcanization accelerator include thiazole compounds such as N-cyclohexyl-2-benzothiazole sulfenamide, N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole, and dibenzothiazole-dibenzothiazyl disulfide; guanidine compounds such as diphenylguanidine, triphenylguanidine, di-o-tolylguanidine, o-tolyl biguanide, and diphenylguanidine phthalate; aldehyde-amine or aldehyde-ammonia compounds such as reaction products of acetaldehyde with aniline, butyraldehydeaniline condensates, hexamethylenetetramine, and acetaldehyde ammonia; imidazoline compounds such as 2-mercaptoimidazoline; thiourea compounds such as thiocarbanilide, diethylthiourea, dibutylthiourea, trimethylthiourea, and di-o-tolylthiourea; thiuram compounds such as tetramethylthiuram monosulfide, tetramethylthiuram disulfide, tetraethylthiuram disulfide, tetrabutylthiuram disulfide, and pentamethylenethiuram tetrasulfide; dithioic acid salt compounds such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, and tellurium diethyldithiocarbamate; xanthate compounds such as zinc dibutylxanthate; and zinc oxide.

In the case where an organic peroxide is employed as the vulcanizing agent, it is preferable to use a vulcanization auxiliary in combination. Examples of the vulcanization auxiliary include quinone dioxime compounds such as p-quinone dioxime; methacrylate compounds such as polyethylene glycol dimethacrylate; allyl compounds such as diallyl phthalate and triallyl cyanurate; maleimide compounds; and divinylbenzene.

Although in the present invention, vulcanized rubber compositions which assume tints other than black and have antistatic performance can be obtained without using carbon black, incorporation of carbon black in the rubber composition of the present invention to give a black rubber may be conducted depending upon applications. Such a black rubber composition is also within the scope of the present invention.

The present invention will be explained in more detail with reference to the following examples, which should not be construed to be limiting the scope of the invention.

REFERENCE EXAMPLE 1

Into a 1-liter stainless steel-made autoclave equipped with a stirrer, a gas phase discharge line, and a feed line were charged 100 g of an ethylene-vinyl acetate copolymer having a vinyl acetate content of 31% by weight, a number average molecular weight of 1,800, and a softening point of 30° C., 200 g of methyl alcohol, and 0.4 g of sodium hydroxide. The mixture was allowed to react for 2 hours with stirring by heating at a temperature of 65° C. while the gas phase discharge line was kept open. Thereafter, the temperature was raised to 140° C. over a period of 1 hour thereby to remove all the volatile substances from the system. The thus-obtained saponification product was in a wax-like state with a melting point of 55° C. and had a saponification degree of 60%. Subsequently, 0.17 g of potassium hydroxide was added to the saponification product. The mixture was heated to 180° C., and ethylene oxide was introduced until the pressure became 2 kg/cm$^2$. After a pressure decrease due to the addition reaction of ethylene oxide was observed, ethylene oxide was further introduced intermittently so as to keep the pressure at 2 kg/cm². Thus, ethylene oxide was fed in a total amount of 170 g over a period of 1 hour. At the time when the pressure had decreased to 0.4 kg/cm², the temperature was lowered to 100° C., and the reaction product was taken out. As a result, 250 g of an adduct was obtained, which had a melting point of 70° C. and a hydroxyl value of 100 mg-KOH/g.

In this adduct, the amount of ethylene oxide added to was 200 parts by weight per 100 parts by weight of the saponification product.

REFERENCE EXAMPLE 2

Into a 700-liter stainless steel-made autoclave equipped with a stirrer, a gas phase discharge line, and a feed line were charged 160 kg of an ethylene-vinyl acetate copolymer having a vinyl acetate content of 31% by weight, a number average molecular weight of 1,800, and a softening point of 30° C., 320 kg of methyl alcohol, and 0.96 kg of sodium hydroxide. The mixture was allowed to react for 2 hours with stirring by heating at a temperature of 65° C. while the gas phase discharge line was kept open. Thereafter, the temperature was raised to 142° C. over a period of 1 hour thereby to remove all the volatile substances from the system. The thus-obtained saponification product was in a wax-like state with a melting point of 83° C. and had a saponification degree of 90%. Subsequently, 0.27 kg of potassium hydroxide was added to the saponification product. The mixture was heated to 180° C. and ethylene oxide was introduced until the ethylene oxide pressure in the autoclave became 2 kg/cm². After a pressure decrease due to the addition reaction of ethylene oxide was observed, ethylene oxide was further introduced intermittently so as to keep the pressure at 2 kg/cm². Thus, ethylene oxide was fed in a total amount of 272 kg over a period of 1 hour. At the time when the pressure had decreased to 0.4 kg/cm², the temperature was lowered to 100° C., and the reaction product was taken out. As a result, 408 kg of an adduct was obtained, which had a melting point of 51° C. and a hydroxyl value of 110 mg-KOH/g.

In this adduct, the amount of ethylene oxide added was 200 parts by weight per 100 parts by weight of the saponification product.

REFERENCE EXAMPLE 3

Into a 1-liter stainless steel-made autoclave equipped with a stirrer, a gas phase discharge line, and a feed line were charged 100 g of an ethylene-vinyl acetate copolymer having a vinyl acetate content of 16% by weight, a number average molecular weight of 2,500, and a softening point of 72° C., 200 g of methyl alcohol, and 0.6 g of sodium hydroxide. The mixture was allowed to react for 2 hours with stirring by heating at a temperature of 65° C. while the gas phase discharge line was kept open. Thereafter, the temperature was raised to 140° C. over a period of 1 hour thereby to remove all the volatile substances from the system. The thus-obtained saponification product was in a wax-like state with a melting point of 90° C. and had a saponification degree of 90%. Subsequently, 0.17 g of potassium hydroxide was added to the saponification product. The mixture was heated to 180° C., and ethylene oxide was introduced until the pressure became 2 kg/cm². After a pressure decrease due to the addition reaction of ethylene oxide was observed, ethylene oxide was further introduced intermittently so as to keep the pressure at 2 kg/cm². Thus, ethylene oxide was fed in a total amount of 170 g over a period of 1 hour. At the time when the pressure had decreased to 0.4 kg/cm², the temperature was lowered to 100° C. and the reaction product was taken out. As a result, 250 g of an adduct was obtained, which had a melting point of 52° C. and a hydroxyl value of 54 mg-KOH/g.

In this adduct, the amount of ethylene oxide added was 200 parts by weight per 100 parts by weight of the saponification product.

EXAMPLES 1 TO 3 AND COMPARATIVE EXAMPLES 1 AND 2

For each example, ingredients as shown in Section (I) in Table 1 were kneaded with a Banbury mixer for 4 minutes at a temperature of 70° to 130° C. After the kneaded compound was cooled to room temperature, ingredients as shown in Section (II) in Table 1 were incorporated into the compound by means of open rolls at a temperature of 40° to 60° C. The thus-obtained composition was measured for Mooney viscosity (ML$_{1+4}$ 100° C.) in accordance with JIS K-6300. The composition was then vulcanized by means of a hot press at 160° C. for 10 minutes to obtain a vulcanized sheet having a thickness of 2 mm. This vulcanized sheet was subjected to a tensile test in accordance with JIS K-6301. The vulcanized sheet was also allowed to stand at room temperature for 20 days, and its appearance was then examined to evaluate the degree of blooming. The results obtained are summarized in Table 1.

EXAMPLES 4 TO 6 AND COMPARATIVE EXAMPLES 3 TO 5

Using a mixture of two kinds of rubbers as a synthetic rubber, rubber compositions were prepared in the same manner as in Examples 1 to 3 except that ingredients as shown in Table 2 were used in place of those shown in Table 1. From the thus-prepared rubber compositions, vulcanized sheets were obtained and evaluated in the same manner as in Examples 1 to 3 except that the vulcanized sheets were allowed to stand in a room for 15 days. The results obtained are summarized in Table 2.

EXAMPLES 7 TO 10 AND COMPARATIVE EXAMPLES 6 TO 9

Using various kinds of rubbers as a synthetic rubber, rubber compositions were prepared in the same manner as in Examples 1 to 3 except that ingredients as shown in Table 3 were used in place of those shown in Table 1. From the thus-prepared rubber compositions, vulcanized sheets were obtained and evaluated in the same manner as in Examples 1 to 3 except that the vulcanization time was varied as shown in Table 3 and that the vulcanized sheets were allowed to stand in a room for 15 days. The results obtained are summarized in Table 3.

EXAMPLES 11 TO 13 AND COMPARATIVE EXAMPLE 10

For each example, ingredients as shown in Section (I) in Table 4 were kneaded with a Banbury mixer for 4 minutes at a temperature of 70° to 130° C. After the kneaded compound was cooled to room temperature, ingredients as shown in Section (II) in Table 4 were incorporated into the compound by means of open rolls at a temperature of 40° to 60° C. The thus-obtained composition was measured for Mooney viscosity (ML$_{1+4}$ 100° C.) in accordance with JIS K-6300. The composition was then vulcanized by means of a hot press at 160° C. for 20 minutes to obtain a vulcanized sheet having a thickness of 2 mm. This vulcanized sheet was subjected to a tensile test (JIS K-6301) and further measured for compression set and elongation set (JIS K-6301) and for volume resistivity (JIS K-6911). The results obtained are summarized in Table 4.

TABLE 1

|  | Example No. | | | Comparative Example No. | |
|---|---|---|---|---|---|
|  | 1 | 2 | 3 | 1 | 2 |
| (I) | | | | | |
| (a) Synthetic rubber[1]: | | | | | |
| Kind | EPDM | EPDM | EPDM | EPDM | EPDM |
| Amount (weight part) | 100 | 100 | 100 | 100 | 100 |
| (b) Adduct[2]: | | | | | |
| Kind | A | B | C | | |
| Amount (weight part) | 2 | 2 | 2 | | |
| Tackirol ® 101[3] (weight part) | | | | 1 | |
| PEG #4000[4] (weight part) | | | | | 1 |
| FEF Black (weight part) | 100 | 100 | 100 | 100 | 100 |
| PW-380[5] (weight part) | 30 | 30 | 30 | 30 | 30 |
| Zinc Oxide (weight part) | 5 | 5 | 5 | 5 | 5 |
| Stearic Acid (weight part) | 1 | 1 | 1 | 1 | 1 |
| Calcium Oxide (weight part) | 3 | 3 | 3 | 3 | 3 |
| (II) | | | | | |
| Zinc Dibutyldithiocarbamate (weight part) | 2.0 | 2.0 | 2.0 | 2.0 | 2.0 |
| Tetramethylthiuram Disulfide (weight part) | 0.5 | 0.5 | 0.5 | 0.5 | 0.5 |
| Dipentamethylenethiuram Tetrasulfide (weight part) | 0.5 | 0.5 | 0.5 | 0.5 | 0.5 |
| Dibenzothiazyl Disulfide (weight part) | 1.0 | 1.0 | 1.0 | 1.0 | 1.0 |
| Sulfur (weight part) | 1.0 | 1.0 | 1.0 | 1.0 | 1.0 |
| Unvulcanized Composition $ML_{1+4}$ 100° C. | 60 | 58 | 59 | 59 | 59 |
| Evaluation of Vulcanizate | | | | | |
| Tensile Test: | | | | | |
| Tb (kgf/cm²) | 138 | 140 | 134 | 147 | 144 |
| Eb (%) | 340 | 330 | 360 | 300 | 330 |
| Hs (JIS-A) | 73 | 73 | 73 | 74 | 73 |
| Appearance (blooming)[6] | A | A | A | C | B |

[1]EPDM: Ethylene-propylene-ENB rubber, produced by Sumitomo Chemical Company, Limited; $ML_{1+4}$ 100° C. = 35, Iodine value = 15
[2]A: Adduct of Reference Example 1, B: Adduct of Reference Example 2, C: Adduct of Reference Example 3
[3]Non-reactive phenol-formaldehyde resin, produced by Sumitomo Chemical Company, Limited
[4]Polyethylene glycol, produced by Sanyo Chemical Industries, Ltd.
[5]Paraffin-based process oil, produced by Idemitsu Kosan Co., Ltd.
[6]A: No blooming with surface gloss. B: Blooming occurred party. C: Blooming occurred over the entire surface.

TABLE 2

|  | Example No. | | | Comparative Example No. | | |
|---|---|---|---|---|---|---|
|  | 4 | 5 | 6 | 3 | 4 | 5 |
| (I) | | | | | | |
| (a) Synthetic Rubber[1]: | | | | | | |
| Kind | EPDM(A) | EPDM(A) | EPDM(A) | EPDM(A) | EPDM(A) | EPDM(A) |
| Amount (weight part) | 70 | 70 | 70 | 70 | 70 | 70 |
| Kind | EPDM(B) | EPDM(B) | EPDM(B) | EPDM(B) | EPDM(B) | EPDM(B) |
| Amount (weight part) | 42 | 42 | 42 | 42 | 42 | 42 |
| (b) Adduct: | | | | | | |
| Kind | B | B | B | | | |
| Amount (weight part) | 3 | 5 | 7 | | | |
| Tackirol ® 101 (weight part) | | | | 1 | | 2 |
| PEG #4000 (weight part) | | | | | 1 | 2 |
| FEF Black | 90 | 90 | 90 | 90 | 90 | 90 |
| PW-90[2] | 80 | 80 | 80 | 80 | 80 | 80 |
| Zinc Oxide | 5 | 5 | 5 | 5 | 5 | 5 |
| Stearic Acid | 1 | 1 | 1 | 1 | 1 | 1 |
| Heavy Calcium Carbonate | 80 | 80 | 80 | 80 | 80 | 80 |
| (II) | | | | | | |
| Zinc Dibutyldithiocarbamate (weight part) | 2.0 | 2.0 | 2.0 | 2.0 | 2.0 | 2.0 |
| Tetramethylthiuram Disulfide (weight part) | 0.4 | 0.4 | 0.4 | 0.4 | 0.4 | 0.4 |
| Cyclohexylbenzothiazyl Sulfenamide (weight part) | 2.0 | 2.0 | 2.0 | 2.0 | 2.0 | 2.0 |
| Sulfur | 1.0 | 1.0 | 1.0 | 1.0 | 1.0 | 1.0 |
| Unvulcanized Composition $ML_{1+4}$ 100° C. | 38 | 36 | 38 | 37 | 39 | 40 |
| Evaluation of Vulcanizate | | | | | | |
| Tensile test: | | | | | | |
| Tb (kgf/cm²) | 112 | 115 | 108 | 119 | 117 | 108 |
| Eb (%) | 690 | 710 | 730 | 660 | 640 | 660 |
| Hs (JIS-A) | 52 | 52 | 51 | 53 | 52 | 52 |
| Appearance (blooming) | A | A | A | C | B | B |

[1]EPDM(A): Ethylene-propylene-ENB rubber, produced by Sumitomo Chemical Company, Limited; $ML_{1+4}$ 121° C. = 70, Iodine Value = 18
EPDM(B): Ethylene-propylene-ENB rubber, produced by Sumitomo Chemical Company, Limited; $ML_{1+4}$ 121° C. = 70, Iodine value = 18, 40PHR oil-extended grade
[2]Paraffin-based process oil, produced by Idemitsu Kosan Co., Ltd.
Other notes than the above are the same as described under Table 1.

TABLE 3

| | Ex. 7 | Comp. Ex. 6 | Ex. 8 | Comp. Ex. 7 | Ex. 9 | Comp. Ex. 8 | Ex. 10 | Comp. Ex. 9 |
|---|---|---|---|---|---|---|---|---|
| (I) | | | | | | | | |
| (a) Synthetic rubber[1]: | | | | | | | | |
| Kind | CR | CR | NBR | NBR | SBR | SBR | IIR | IIR |
| Amount (weight part) | 100 | 100 | 100 | 100 | 100 | 100 | 100 | 100 |
| (b) Adduct: | | | | | | | | |
| Kind | B | | B | | B | | B | |
| Amount (weight part) | 2 | | 2 | | 2 | | 2 | |
| SRF Black (weight part) | 50 | 50 | 40 | 40 | | | 50 | 50 |
| FEF Black | | | | | 60 | 60 | | |
| Dioctyl Phthalate (weight part) | 15 | 15 | 10 | 10 | | | | |
| Sunthene ® 4240[2] (weight part) | | | | | 15 | 15 | | |
| PW-90 (weight part) | | | | | | | 15 | 15 |
| Nipsil ® VN3[3] (weight part) | | | | | | | 20 | 20 |
| Heavy Calcium Carbonate (weight part) | | | | | | | 30 | 30 |
| Zinc Oxide (weight part) | | | 5 | 5 | 5 | 5 | 5 | 5 |
| Stearic Acid (weight part) | 1 | 1 | 1 | 1 | 1 | 1 | 2 | 2 |
| Isopropylphenylenediamine (weight part) | 1 | 1 | 1 | 1 | | | | |
| Phenylnaphthylamine (weight part) | 1 | 1 | | | | | | |
| Trimethyldihydroquinone (weight part) | | | 2 | 2 | 1 | 1 | | |
| Paraffin Wax (weight part) | 1 | 1 | 1 | 1 | | | | |
| (II) | | | | | | | | |
| Magnesium Oxide (weight part) | 4 | 4 | | | | | | |
| Ethylenethiourea (weight part) | 0.1 | 0.1 | | | | | | |
| Tetramethylthiuram Disulfide (weight part) | | | 1.0 | 1.0 | | | 1.5 | 1.5 |
| Mercaptodibenzothiazole (weight part) | | | 2.0 | 2.0 | | | 1.0 | 1.0 |
| Cyclohexylbenzothiazyl Sulfenamide (weight part) | | | | | 1.0 | 1.0 | | |
| Zinc Dibutyldithiocarbamate | | | | | | | 1.0 | 1.0 |
| Zinc Oxide (weight part) | 5 | 5 | | | | | | |
| Sulfur (weight part) | 1.0 | 1.0 | 2.0 | 2.0 | 1.5 | 1.5 | 1.5 | 1.5 |
| Unvulcanized Composition $ML_{1+4}$ 100° C. | 37 | 35 | 50 | 48 | 54 | 55 | 49 | 50 |
| Vulcanizing Time (min.) at 160° C. | 20 | 15 | 5 | 3 | 5 | 20 | 20 | 20 |
| Evaluation of Vulcanizate | | | | | | | | |
| Tensile test: | | | | | | | | |
| Tb (kgf/cm2) | 165 | 178 | 83 | 109 | 122 | 127 | 112 | 110 |
| Eb (%) | 460 | 400 | 360 | 400 | 680 | 540 | 580 | 600 |
| Hs (JIS-A) | 56 | 56 | 57 | 58 | 60 | 64 | 54 | 56 |
| Appearance (blooming) | A | C | A | C | A | C | A | C |

[1] CR: Neoprene WRT, produced by Showa Neoprene Co., Ltd. NBR: Nipol 1042, produced by Nippon Zeon Co., Ltd. SBR: SBR 1502, produced by Sumitomo Chemical Company, Limited IIR: IIR 268, produced by Japan Butyl Co., Ltd.
[2] Naphthene-based process oil, produced by Sun Oil Co., Ltd.
[3] Hydrated silica, produced by Nippon Silica Industrial Co., Ltd.
Other notes than the above are the same as described under Tables 1 and 2.

TABLE 4

| | Example No. | | | Comparative Example No. |
|---|---|---|---|---|
| | 11 | 12 | 13 | 10 |
| (I) | | | | |
| (a) Synthetic rubber[1] | | | | |
| Kind | EPDM | EPDM | EPDM | EPDM |
| Amount (weight part) | 100 | 100 | 100 | 100 |
| (b) Adduct[2] | | | | |
| Kind | A | A | A | |
| Amount (weight part) | 2 | 5 | 10 | |
| Hydrated Silica[3] (weight part) | 35 | 35 | 35 | 35 |
| PW-380[4] (weight part) | 10 | 10 | 10 | 10 |
| Zinc Oxide (weight part) | 5 | 5 | 5 | 5 |
| Stearic Acid (weight part) | 1 | 1 | 1 | 1 |
| (II) | | | | |
| Zinc Dibutyldithiocarbamate (weight part) | 2.0 | 2.0 | 2.0 | 2.0 |
| Tetramethylthiuram Disulfide (weight part) | 0.5 | 0.5 | 0.5 | 0.5 |
| Dipentamethylene-thiuram Tetrasulfide (weight part) | 0.5 | 0.5 | 0.5 | 0.5 |
| Mercaptobenzothiazole (weight part) | 1.0 | 1.0 | 1.0 | 1.0 |
| Sulfur (weight part) | 1.5 | 1.5 | 1.5 | 1.5 |
| Unvulcanized Composition $ML_{1+4}$ 100° C. | 58 | 58 | 57 | 62 |
| Evaluation of Vulcanizate | | | | |
| Tensile test: | | | | |
| Tb (kg/cm2) | 144 | 128 | 112 | 164 |
| Eb (%) | 440 | 430 | 420 | 500 |
| Hs (JIS-A) | 66 | 65 | 64 | 66 |
| M300 (kgf/cm2) | 60 | 58 | 55 | 56 |
| Compression Set (%) | 76 | 69 | 67 | 80 |
| Elongation Set (%) | 5 | 6 | 7 | 10 |
| Volume Resistivity | 4.6 × | 1.1 × | 8.7 × | 4.3 × |

TABLE 4-continued

| | Example No. | | | Comparative Example No. |
|---|---|---|---|---|
| | 11 | 12 | 13 | 10 |
| (Ωcm) | $10^{12}$ | $10^{10}$ | $10^8$ | $10^{14}$ |

[1] EPDM: Ethylene-propylene-ENB rubber, produced by Sumitomo Chemical Company, Limited; $ML_{1+4}$ 100° C. = 43, Iodine value = 24
[2] A Adduct of Reference Example 1
[3] Nipsil ® VN3, produced by Nippon Silica Industrial Co., Ltd.
[4] Paraffin-based process oil, produced by Idemitsu Kosan Co., Ltd.

As described above, the present invention provides a rubber composition from which a vulcanized rubber composition can be obtained which can retain its excellent appearance over a prolonged period of time because of freedom from blooming, has excellent antistatic performance due to its electrical conductivity, can be colored in various tints including white, and also has excellent properties in terms of tensile strength and specific gravity.

While the invention has been described in detail and with reference to specific embodiments thereof, it will be apparent to one skilled in the art that various changes and modifications can be made therein without departing from the spirit and scope thereof.

What is claimed is:

1. A rubber composition comprising (a) 100 parts by weight of a synthetic rubber and (b) from 0.5 to 10 parts by weight of an alkylene oxide adduct of a saponified ethylene-saturated carboxylic acid vinyl ester copolymer.

2. A rubber composition as claimed in claim 1, wherein said synthetic rubber (a) is an ethylene-α-olefin copolymer rubber, a styrene-butadiene copolymer rubber, a chloroprene rubber, an acrylonitrile rubber, or an isoprene-isobutylene copolymer rubber.

3. A rubber composition as claimed in claim 1, wherein said synthetic rubber (a) is an ethylene-α-olefin copolymer rubber.

4. A rubber composition as claimed in claim 1, wherein said alkylene oxide adduct (b) is an addition product obtained by adding from 20 to 1,000 parts by weight of an alkylene oxide to 100 parts by weight of a saponified ethylene-saturated carboxylic acid vinyl ester copolymer having an ethylene content of from 1 to 90% by weight, a number average molecular weight of from 1,000 to 20,000, and a saponification degree of from 30 to 100%.

5. A rubber composition as claimed in claim 1, wherein the saturated carboxylic acid vinyl ester in said alkylene oxide adduct (b) is vinyl acetate.

6. A rubber composition as claimed in claim 1, wherein the alkylene oxide in said alkylene oxide adduct (b) is ethylene oxide.

* * * * *